(12) United States Patent
Lambert et al.

(10) Patent No.: US 11,310,033 B2
(45) Date of Patent: Apr. 19, 2022

(54) SYSTEM AND METHOD FOR OPERATING PSEUDORANDOM GENERATORS

(71) Applicant: Certicom Corp., Mississauga (CA)

(72) Inventors: Robert John Lambert, Cambridge (CA); Nevine Maurice Nassif Ebeid, Kitchener (CA); Daniel Richard L. Brown, Mississauga (CA); Atsushi Yamada, Etobicoke (CA)

(73) Assignee: BLACKBERRY LIMITED, Waterloo (CA)

( * ) Notice: Subject to any disclaimer, the term of this patent is extended or adjusted under 35 U.S.C. 154(b) by 306 days.

(21) Appl. No.: 16/431,845

(22) Filed: Jun. 5, 2019

(65) Prior Publication Data

US 2020/0389293 A1    Dec. 10, 2020

(51) Int. Cl.
*H04L 9/06* (2006.01)
*G06F 7/58* (2006.01)
*H03M 7/30* (2006.01)

(52) U.S. Cl.
CPC ............ *H04L 9/0668* (2013.01); *G06F 7/582* (2013.01); *H03M 7/3059* (2013.01); *H04L 9/0643* (2013.01)

(58) Field of Classification Search
CPC ........ G06F 7/58; G06F 7/582; H03M 7/3059; H04L 9/0643; H04L 9/0668
See application file for complete search history.

(56) References Cited

U.S. PATENT DOCUMENTS

| | | | |
|---|---|---|---|
| 7,571,199 B1 | 8/2009 | Field et al. | |
| 9,658,832 B2 * | 5/2017 | Tsirkin | G06F 7/588 |
| 10,452,357 B2 * | 10/2019 | Tan | G06F 7/588 |
| 2004/0126031 A1 * | 7/2004 | Dwyer | H04N 19/184 |
| | | | 382/251 |
| 2013/0136255 A1 * | 5/2013 | Brown | H04L 9/001 |
| | | | 380/28 |
| 2015/0078457 A1 * | 3/2015 | Hendry | H04N 19/187 |
| | | | 375/240.25 |
| 2015/0117643 A1 * | 4/2015 | Best | H04W 12/03 |
| | | | 380/46 |
| 2015/0243359 A1 * | 8/2015 | Kho | G06F 21/554 |
| | | | 711/103 |
| 2017/0208347 A1 * | 7/2017 | Martin | H04N 19/91 |
| 2019/0042867 A1 * | 2/2019 | Chen | G06K 9/46 |
| 2019/0320090 A1 * | 10/2019 | Popa | H03M 7/3068 |

FOREIGN PATENT DOCUMENTS

WO    2013003943 A1    1/2013

OTHER PUBLICATIONS

EPO: Extended European Search Report relating to EP application No. 20173464.7, dated Jul. 20, 2020.

* cited by examiner

*Primary Examiner* — Trang T Doan
(74) *Attorney, Agent, or Firm* — Rowand LLP (57) ABSTRACT

A method for operating a pseudorandom generator is disclosed. The method may be implemented by a processor of a mobile computing device. The method includes: collecting raw sensor data from at least one sensor associated with the mobile computing device; selecting a subset of the raw sensor data; retrieving first representation representing accumulated entropy associated with one or more previously acquired raw sensor data sets for the at least one sensor; and generating a seed for a pseudorandom generator based on combining the first representation and the selected subset of raw sensor data.

20 Claims, 5 Drawing Sheets

SYSTEM AND METHOD FOR OPERATING PSEUDORANDOM GENERATORS

TECHNICAL FIELD

The present disclosure relates to cryptography and, in particular, to systems and methods for operating pseudorandom generators on mobile computing devices.

BACKGROUND

Cryptographic systems rely on use of secret data that is known only to authorized persons and unpredictable to others. To achieve this unpredictability, randomization is typically employed. Various applications in cryptography, such as key generation, cryptographic hash functions and nonces, have a requirement for random data.

Pseudorandom number generators (PRNGs) may be used to generate sequences of numbers that are suitable for cryptographic applications. The security strength of cryptographic protocols that employ a PRNG depends on the entropy source of the PRNG. In particular, the choice of a good random initial value, or seed, for a PRNG is crucial for performance and security. High entropy is generally desirable for selecting PRNG seed data.

Generating high quality random data on mobile devices may be challenging. Mobile devices may have limited number of entropy sources, and the available sources may be isolated hardware or software components that are easy to locate and observe. As a consequence, implementations of pseudorandom generators on mobile devices may suffer from weaker security against cryptanalytic attacks.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method for operating a pseudorandom number generator on a mobile computing device. The method includes: collecting raw sensor data from at least one sensor associated with the mobile computing device; selecting a subset of the raw sensor data; retrieving a first representation of accumulated entropy associated with one or more previously acquired raw sensor data sets for the at least one sensor; and generating a seed for a pseudorandom generator based on combining the first representation and the selected subset of raw sensor data.

In another aspect, the present disclosure describes a mobile computing device. The mobile computing device includes at least one sensor, memory, and a processor coupled with the at least one sensor and the memory. The processor is configured to: collect raw sensor data from at least one sensor associated with the mobile computing device; select a subset of the raw sensor data; retrieve a first representation of accumulated entropy associated with one or more previously acquired raw sensor data sets for the at least one sensor; and generate a seed for a pseudorandom generator based on combining the first representation and the selected subset of raw sensor data.

Other example embodiments of the present disclosure will be apparent to those of ordinary skill in the art from a review of the following detailed descriptions in conjunction with the drawings.

Many cryptographic applications, such as secret keys for encryption algorithms and nonces used in various network protocols, rely on existence of random bits. Finding a good (i.e. high entropy) source of random bits can be challenging. Mobile devices generally have a limited number of sources of randomness. These may include, among others, the state of software running on the device, ambient radio conditions, and device system clock. The random values generated from these sources are often insufficient for cryptographic applications. The security of a cryptographic system depends, at least in part, on the quality of the underlying random number generation process. A lack of quality may leave the system vulnerable to attacks or even to complete compromise. Therefore, designing a high quality random number generator is a crucial component of constructing a secure cryptographic system.

The present disclosure describes a mechanism for supplying mobile computing devices with useful random data. In an aspect, a method for generating pseudorandom numbers on mobile devices is disclosed. Raw sensor data is collected from one or more sensors associated with a mobile device. The output from a plurality of observations of raw sensor data is processed and accumulated, to be used as a source of random data. The resulting "accumulated entropy" data may provide high quality initialization data for pseudorandom generators. The operations performed in collecting and processing the raw sensor data are designed to hinder attempts by attackers to obtain useful information on the output of the sensor(s) that produced the accumulated data. The accumulated entropy data may be maintained as a representation of the state of entropy associated with the mobile device, the one or more sensors, and/or a pseudorandom generator of the device.

Figure 1:
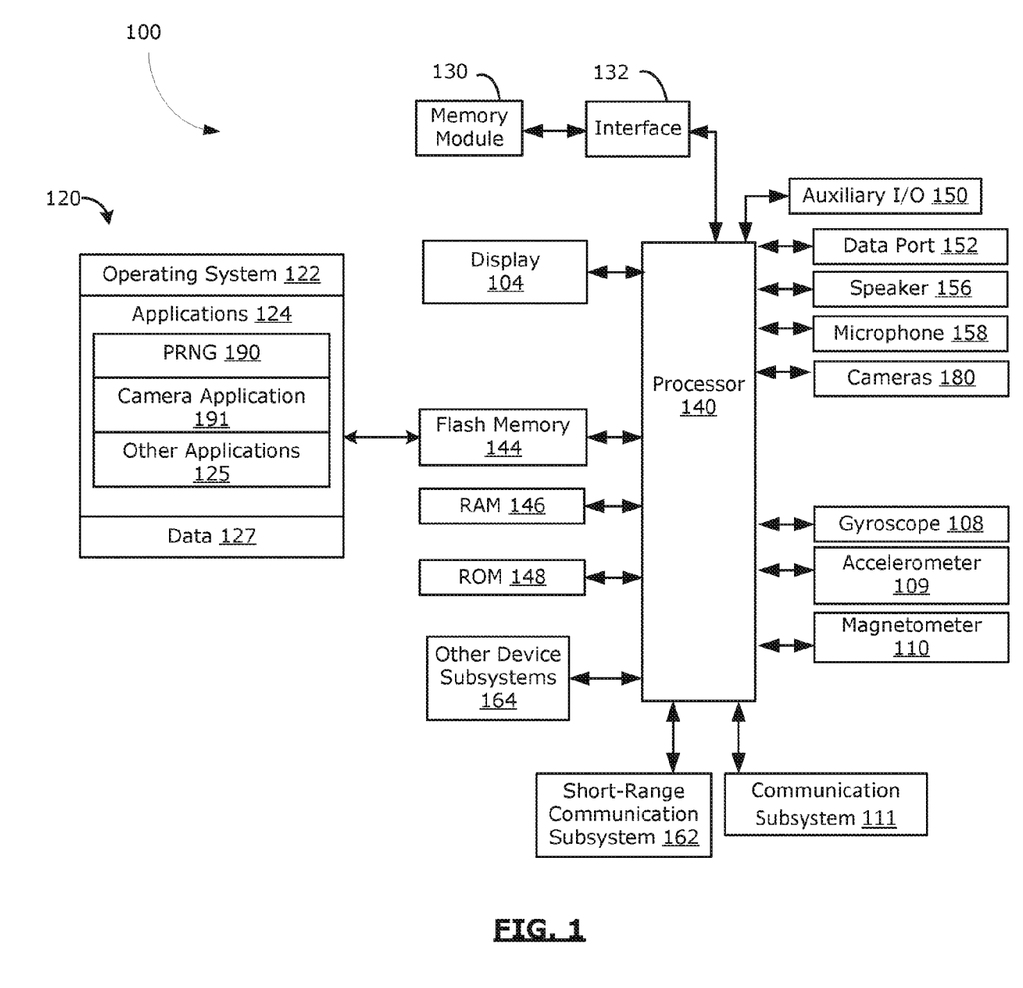
FIG. 1 is a block diagram illustrating components of an example mobile computing device.

Reference is first made to FIG. 1, which illustrates a block diagram of an example computing device 100. In an example embodiment, the computing device 100 may be a mobile communication device. The mobile communication device may be configured for two-way communication, having data and optionally voice communication capabilities, and the capability to communicate with other computer systems, e.g. via the internet. In other embodiments, the computing device 100 may take other forms, such as smartwatches, computers, tablets, laptops, or any other mobile electronic device.

The computing device 100 of FIG. 1 may include a housing which houses components of the computing device 100. Internal components of the computing device 100 may be constructed on a printed circuit board (PCB). The computing device 100 includes a controller including at least one processor 140 (such as a microprocessor) which controls the overall operation of the computing device 100. The processor 140 interacts with device subsystems, such as a wireless communication subsystem 111, for exchanging radio frequency signals with a wireless network to perform communication functions. The processor 140 interacts with additional device subsystems including one or more input interfaces (which may include, without limitation, any of the following: one or more cameras 180, a keyboard, control buttons, microphones 158, a gesture sensor, and/or a touch-sensitive overlay associated with a touchscreen display), flash memory 144, random access memory (RAM) 146, read only memory (ROM) 148, auxiliary input/output (I/O) subsystems 150, a data port 152 (which may be a serial data port, such as a Universal Serial Bus (USB) data port), one or more output interfaces (such as a display 104), one or more speakers 156, or other output interfaces), a short-range communication subsystem 162, and other device subsystems generally designated as 164.

In some example embodiments, the auxiliary input/output (I/O) subsystems 150 may include an external communication link or interface, for example, an Ethernet connection. The communication subsystem 111 may include other wireless communication interfaces for communicating with other types of wireless networks, e.g. Wi-Fi networks.

In some example embodiments, the computing device 100 also includes a removable memory module 130 (typically including flash memory) and a memory module interface 132. Network access may be associated with a subscriber or user of the computing device 100 via the memory module 130, which may be a Subscriber Identity Module (SIM) card for use in a GSM network or other type of memory module for use in the relevant wireless network type. The memory module 130 may be inserted in or connected to the memory module interface 132 of the computing device 100.

The computing device 100 may store data 127 in an erasable persistent memory, which in one example embodiment is the flash memory 144. In some example embodiments, the data 127 may include service data having information required by the computing device 100 to establish and maintain communication with a wireless network. The data 127 may also include user application data such as messages (e.g. emails, texts, multimedia messages, etc.), address book and contact information, camera data, calendar and schedule information, notepad documents, image files, and other commonly stored user information stored on the computing device 100 by its users, and other data. The data 127 stored in the persistent memory (e.g. flash memory 144) of the computing device 100 may be organized, at least partially, into a number of databases or data stores each containing data items of the same data type or associated with the same application. For example, email messages, contact records, and task items may be stored in individual databases within the computing device 100 memory.

The short-range communication subsystem 162 is an additional optional component which provides for communication between the computing device 100 and different systems or devices, which need not necessarily be similar devices. For example, the short-range communication subsystem 162 may include an infrared device and associated circuits and components, a wireless bus protocol compliant communication mechanism such as a Bluetooth® communication module to provide for communication with similarly-enabled systems and devices, and/or a near-field communication (NFC) interface.

The computing device 100 includes one or more cameras 180. The cameras 180 are configured to generate camera data, such as images in the form of still photographs and/or video data. The camera data may be captured in the form of an electronic signal which is produced by an image sensor associated with the cameras 180. More particularly, the image sensor is configured to produce an electronic signal in dependence on received light. The image sensor converts an optical image into an electronic signal, which may be output from the image sensor by way of one or more electrical connectors associated with the image sensor. The electronic signal represents electronic image data, which may be referred to as camera data.

The computing device 100 includes one or more sensors. In the example embodiment of FIG. 1, the computing device 100 includes a gyroscope 108, an accelerometer 109, and a magnetometer 110. While FIG. 1 illustrates three separate sensors, in some embodiments, two or more of these sensors may be provided in a common packaging, such as a common electronic chip. For example, in some embodiments, a single electronic chip may include both an accelerometer 109 and a magnetometer 110. Other sensors such as, for example, ambient light sensor, fingerprint sensor, proximity sensor, compass, barometer, and heart rate sensor, may be included in the computing device 100.

The gyroscope 108 measures rotational velocity of the gyroscope 108. In the embodiment illustrated, since the gyroscope 108 is integrated within the computing device 100, the gyroscope 108 effectively measures rotational velocity of the computing device 100. The gyroscope 108 includes one or more sensing axes. For example, the gyroscope 108 may include three orthogonal sensing axes denoted $G_x$ (to represent the gyroscope's x sensing axis), $G_y$ (to represent the gyroscope's y sensing axis) and $G_z$ (to represent the gyroscope's z sensing axis). The gyroscope 108 may produce a gyroscope reading for each of the sensing axes, $G_x$, $G_y$, $G_z$. For example, a gyroscope reading may be produced by the gyroscope 108 based on gyroscope measurements associated with the x sensing axis (such as a rotation about the x sensing axis), the y sensing axis (such as a rotation about the y sensing axis), and the z sensing axis (such as a rotation about the z sensing axis). These gyroscope readings collectively form the gyroscope output. That is, the gyroscope output is an electronic signal which is representative of the gyroscope readings for the sensing axes $G_x$, $G_y$, $G_z$ of the gyroscope 108.

The accelerometer 109 is a device which generates an output signal in dependence on the acceleration of the accelerometer 109. That is, the accelerometer 109 produces an output which reflects the acceleration of the accelerometer 109. More particularly, the accelerometer 109 may generate an output which specifies the magnitude and/or direction of acceleration. In the embodiment illustrated, since the accelerometer 109 is integrated within the computing device 100, the accelerometer 109 effectively measures the acceleration of the computing device 100.

The accelerometer 109 includes one or more sensing axes. In the embodiment illustrated, the accelerometer 109 includes three orthogonal sensing axes denoted $A_x$ (to represent the accelerometer's x sensing axis), $A_y$ (to represent the accelerometer's y sensing axis) and $A_z$ (to represent the accelerometer's z sensing axis) Each sensing axis is orthogonal to the other sensing axes. The accelerometer 109 may produce an accelerometer reading for each of the sensing axes, $A_x$, $A_y$, and $A_z$. For example, an accelerometer reading may be produced by the accelerometer 109 based on accelerometer measurements associated with the x sensing axis (such as an acceleration along the x sensing axis), the y sensing axis (such as an acceleration along the y sensing axis), and the z sensing axis (such as an acceleration along the z sensing axis). These accelerometer readings collectively form the accelerometer output. That is, the accelerometer output is an electronic signal which is representative of the accelerometer readings for the sensing axes $A_x$, $A_y$, $A_z$ of the accelerometer 109.

The magnetometer 110 (which may also be referred to as a digital compass) is a measuring instrument which is used to measure the strength and/or direction of magnetic fields. The magnetometer 110 generates an electronic signal which reflects the direction and/or strength of a magnetic field in the vicinity of the magnetometer 110. Since the magnetometer 110 is mounted within the computing device 100, the magnetometer 110 effectively reflects the direction and/or strength of a magnetic field acting on the computing device 100.

The magnetometer 110 is, in at least some embodiments, a three axis magnetometer 110 which includes three sensing axes $M_x$, $M_y$, $M_z$. In the embodiment illustrated, the magnetometer 110 includes three orthogonal sensing axes denoted $M_x$ (to represent the magnetometer's x sensing axis), $M_y$ (to represent the magnetometer's y sensing axis) and $M_z$ (to represent the magnetometer's z sensing axis). The magnetometer 110 may produce a magnetometer reading for each of the sensing axes, $M_x$, $M_y$, and $M_z$. For example, a magnetometer reading $m_x$ may be produced by the magnetometer 110 based on magnetometer measurements associated with the x sensing axis (such as a magnetic field along the x sensing axis), the y sensing axis (such as a magnetic field along the y sensing axis), and the z sensing axis (such as a magnetic field along the z sensing axis). These magnetometer readings collectively form the magnetometer output. That is, the magnetometer output is an electronic signal which is representative of the magnetometer readings for the sensing axes $M_x$, $M_y$, $M_z$ of the magnetometer 110.

A predetermined set of applications that control basic device operations, including data and possibly voice communication applications, may be installed on the computing device 100 during or after manufacture. Additional applications and/or upgrades to an operating system 122 or software applications 124 may also be loaded onto the computing device 100 through the wireless network, the auxiliary I/O subsystem 150, the data port 152, the short-range communication subsystem 162, or other suitable device subsystems 164. The downloaded programs or code modules may be permanently installed; for example, written into the program memory (e.g. the flash memory 144), or written into and executed from the RAM 146 for execution by the processor 140 at runtime.

The processor 140 operates under stored program control and executes software modules 120 stored in memory such as persistent memory, e.g. in the flash memory 144. As illustrated in FIG. 1, the software modules 120 may include operating system software 122 and one or more applications 124 or modules such as, for example, a pseudorandom generator 190. In the example embodiment of FIG. 1, the pseudorandom generator 190 is illustrated as being implemented as a stand-alone application, but in other example embodiments, the pseudorandom generator 190 may be implemented as part of security operations or services of the operating system 122. The software modules 120 on the computing device 100 may also include a range of additional applications including, for example, a camera application 191, a media playback application, and game applications.

Figure 2:
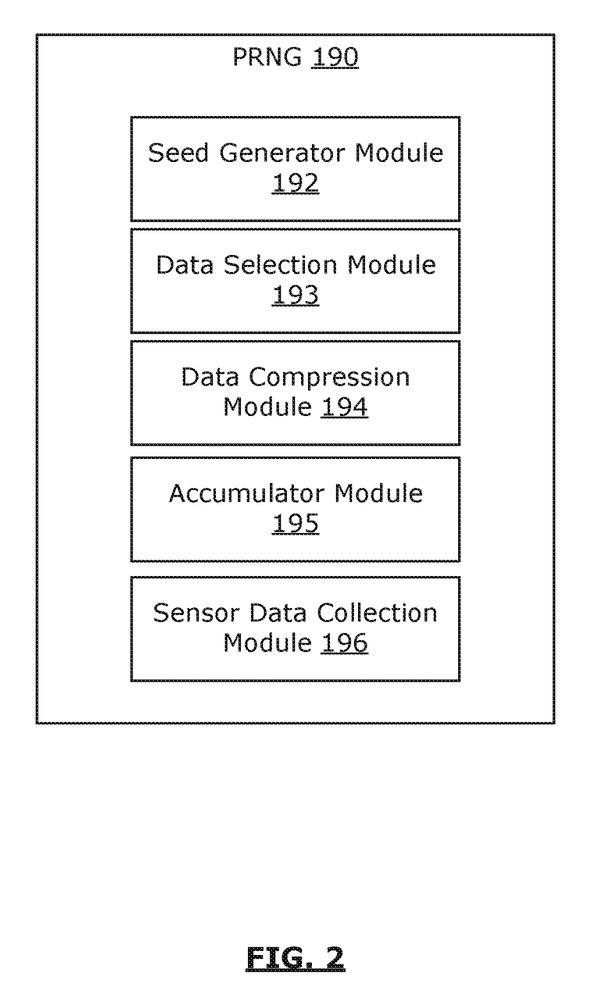
FIG. 2 is a block diagram illustrating modules of a pseudorandom number generator, in accordance with an example embodiment.

Reference is now made to FIG. 2, which is a high-level block diagram illustrating component modules of a pseudorandom number generator (PRNG) 190. The PRNG 190 is configured to generate sequences of pseudorandom numbers and/or bits. A PRNG-generated sequence is completely determined by an initial value, or seed. As illustrated, the PRNG 190 includes a seed generator module 192, a data selection module 193, a data compression module 194, an accumulator module 195, and a sensor data collection module 196. In some embodiments, the PRNG 190 may include different and/or additional modules. It will be understood that the modules illustrated in FIG. 2 may be implemented on the computing device 100 independently of the PRNG 190. For example, the operating system 122 may implement one or more of the modules 192-196 when generating random quantities or when initializing a source for random data, such as a pseudorandom generator. In particular, various different implementations of pseudorandom number generators, such as shift registers based on linear recurrence (e.g. linear feedback shift registers), may be initialized based on data output by one or more of the modules 192-196.

The sensor data collection module 196 collects raw sensor data from one or more sensors of the computing device 100. In at least some embodiments, the sensor data collection module 196 is configured to receive raw output data directly from sensors (e.g. camera, gyroscope, accelerometer, microphone, etc.) during normal operation or use of the sensors. In particular, the sensor data collection module 196 may receive sensor output data from one or more sensors before the output data is processed. For example, the raw output data from sensors may be communicated to the sensor data collection module 196 prior to being compressed and saved in suitable file formats. The sensor data collection module 196 may request to receive raw output data from one or more sensors or access sensors to acquire raw output data. For example, the sensor data collection module 196 may use a sensor framework implementation, such as a sensor application programming interface (API), on the computing device 100 to acquire raw sensor data from the sensors of the computing device 100.

Sensors of the computing device 100 may be communicably connected to the sensor data collection module 196, and raw output data from the sensors may be transmitted upon request from the sensor data collection module 196 or automatically (e.g. on a periodic basis, upon detection of sensor events, etc.). The sensor data collection module 196 may also retrieve raw output data from data stores associated with one or more sensors. For example, if a sensor is configured to store raw output data temporarily in a data store prior to processing or compressing the data, the sensor data collection module 196 may retrieve all or part of the stored data. The collected raw data may be stored in a data store associated with the sensor data collection module 196 or in a separate data storage module (not shown) of the PRNG 196. In some embodiments, the sensor data collection module 196 may receive only select subsets of raw output data from sensors. For example, the sensor data collection module 196 may request that only those subsets of sensor data (e.g. sensor measurements) which satisfy certain predefined criteria be transmitted to the sensor data collection module 196. The sensor data collection module 196 may communicate the predefined criteria to one or more sensors, and the sensors may identify suitable subsets of sensor data to transmit to the sensor data collection module 196 based on the criteria.

The data selection module 193 selects subsets of the raw sensor output data that is received at the sensor data collection module 196 from one or more sensors of the computing device 100. More specifically, the data selection module 193 identifies a portion of the collected raw sensor output data that will be used for deriving a source of randomness or for generating pseudorandom quantities on the computing device 100. In at least some embodiments, the data selection module 193 may apply a selection function on the raw output data from the sensors. A selection function implements an algorithm or heuristic for selecting subsets of sensor output data. For example, a selection function may select certain bits from a sensor data bit stream for inclusion in a subset of raw sensor data.

The data compression module 194 is configured to receive subsets of raw sensor data selected by the data selection module 193 and compress the subsets to obtain compressed outputs. In at least some embodiments, the data compression module 194 applies a one-way compression function to the output of the data selection module 193. For example, the compression function may be a cryptographic hash function, such as, without limitation, MD5, SHA-1, SHA-2, SHA-3, RIPEMD-160, Whirlpool, or BLAKE2.

The accumulator module 195 maintains representations of the state of entropy associated with previously acquired raw sensor output data from one or more sensors of the computing device 100. The accumulator module 195 is configured to iteratively apply an accumulation function on the output of one or more of the data selection module 193 and the data compression module 194. Specifically, the output of a plurality of observations of raw sensor data can be processed through the data selection module 193 and/or the data compression module 194 and accumulated together. The resulting accumulation, or "accumulated entropy" data, may represent a state of entropy associated with output data from the one or more sensors. The accumulated entropy data may be updated as additional sensor data is inputted to the modules 192-196. In at least some embodiments, the accumulated entropy data may be used as a source of entropy by the computing device 100. For example, this entropy may be used to seed a pseudorandom generator for the computing device 100.

The seed generator module 192 generates a seed for the PRNG 190. The sequence of values generated by the PRNG 190 is completely determined by the PRNG's seed. The seed generator module 192 is connected to other modules of the PRNG 190. In particular, the seed generator module 192 is configured to receive data that is output by the accumulator module 195. As will be explained below, the seed generator module 192 may derive a seed for the PRNG 190 based, at least in part, on an accumulated entropy state associated with previously acquired sensor data from one or more sensors of the computing device 100.

Figure 3:
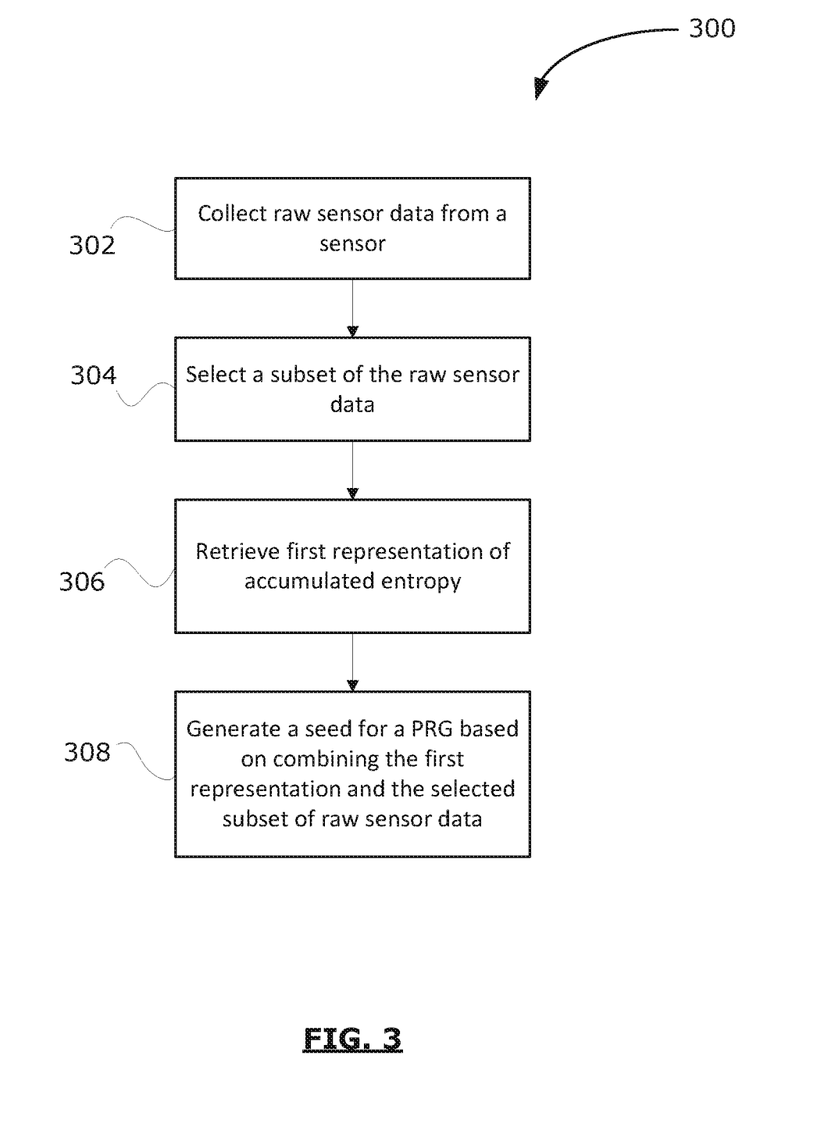
FIG. 3 shows, in flowchart form, an example method for operating a pseudorandom generator on a mobile computing device, in accordance with an example embodiment.

Reference is now made to FIG. 3, which shows, in flowchart form, an example process 300 for operating a pseudorandom generator on a mobile computing device. The process 300, in this example, may be implemented by a mobile computing device, such as the computing device 100 of FIG. 1. For example, the operations of process 300 may be performed by one or more of the modules 192-196 of FIG. 2. More generally, the process 300 may be implemented as a set of operations performed by one or more components of the operating system, a standalone software module (e.g. a pseudorandom number generator application), or other software on a mobile device to initialize and operate a pseudorandom generator.

For illustration purposes, the process 300 will be described with reference to an example embodiment in which output data from a single sensor is used. It will be understood, however, that the process 300 may be implemented to incorporate use of output data from a plurality of different sensors on a mobile computing device.

In operation 302, the mobile device collects raw output data from a sensor of the mobile device. The raw output data may, for example, contain data from a single output or multiple outputs from the sensor. In some embodiments, the device may monitor the sensor, periodically or on a continuous basis, for observation of sensor outputs and associated raw data. For example, various sensor events associated with the sensor may be monitored. A sensor event occurs when a sensor detects a change in the parameters it is measuring. A sensor event may provide, at least, the raw sensor data that triggered the event. Alternatively, the device may request to receive raw output data from the sensor. For example, a request may be transmitted to the sensor to provide raw data from one or more future sensor outputs from the sensor.

The raw data may be pre-processed or minimally processed output data from the sensor that has not been converted to a different format for consumption on the device. In particular, the raw output data may be data that has not been compressed. By way of example, raw image data from an image sensor of a camera may be collected. The image data may be in the form of a raw file. The raw file may contain full resolution data as read out from the camera's image sensor pixels. More generally, raw output data may be saved in a raw file, which is a record of the data captured by the sensor. Raw files may contain sensor data (e.g. image pixel intensities, audio frequencies, etc.), sensor metadata, and/or file metadata.

The format of the raw output data may depend on the type of the sensor. In at least some embodiments, the raw output data from the sensor may be converted to a data bit stream. In particular, the raw output data may be represented in bit streams. For example, in an image sensor, output data representing pixel intensities and colors at various locations on the image sensor may be represented in bit streams. As another example, raw, uncompressed audio data from a microphone input may be stored in PCM format.

In operation 304, the mobile device selects a subset of the collected raw sensor output data. The subset may be selected from output data associated with a single output or multiple outputs from the sensor. In at least some embodiments, the selected subset may contain bits from the sensor's output data bit stream. For example, bits may be selected for inclusion in the subset according to a predefined selection algorithm or function. That is, the mobile device may implement a selection function in operation 304.

An objective of the selection function is to identify those portions of the raw sensor data that will not be saved in a final form on the mobile device. Upon acquiring raw sensor data, the mobile device may perform various processing operations (e.g. sharpening, noise reduction, white balancing, compression, etc.) on the acquired sensor data before finally saving in a suitable final format. The selection function may be configured to identify subsets of raw sensor data that would be lost or eliminated as a result of the data processing.

In at least some embodiments, the selection function may interact with a data compression operation for the sensor to specifically select bits that will not be contained in a compressed version of the raw sensor data. For example, the selection function may be configured to coordinate with the sensor's compression (e.g. lossy compression) algorithm to identify portions of the raw sensor data which will be discarded in deriving the compressed form of the data. Lossy compression may quantize values at lower resolution, or suppress certain component values of a signal in a transform domain. The selection function may select bits that will not be preserved in the output of a lossy compression. For example, in JPEG codecs, images may be encoded by implementing less resolution for chroma information than for luma information (i.e. chroma subsampling). That is, the color detail in an image is reduced by sampling at a lower rate than the brightness. The selection function may be configured to select bits corresponding to the discarded pixels in the chroma components from the raw sensor data representing an image. As another example, the MPEG-1 standard for audio encoding utilizes psychoacoustics to reduce the data rate required by an audio stream. In particular, encoded audio may completely discard certain components of the original audio data, either because they are in frequencies where the human ear has limited sensitivity or are masked by other sounds. The selection function may be configured to identify bits corresponding to the discarded audio components from raw sensor (e.g. microphone) data.

As another example, raw sensor data may be collected from a time-of-flight (ToF) camera. A ToF camera is a camera system that employs time-of-flight techniques to resolve distance between the camera and a subject for each point in an image, by measuring the round trip time of an artificial light signal (e.g. laser, LED). A ToF camera may be used for a wide range of applications in, for example, depth measurements, indoor navigation, gesture recognition, motion tracking, and augmented reality. In operation 304, a subset of ToF camera sensor data may be selected by the mobile device.

In some embodiments, a selection function may select redundant data associated with various operations being performed on the mobile device. For example, for one or more applications that are running on the mobile device, a selection function may identify subsets of application data (e.g. user-specific data, file data, geolocation data, etc.) which are stored on the mobile device and not currently used by the applications. As another example, if the mobile device includes multiple cameras (e.g. different lenses, such as telephoto lens and monochrome lens) for generating images, a selection function may be configured to identify/select those subsets of raw camera output data that are not currently used in image generation.

The data which does not make it into the compressed output may be ideal for use in random quantities or as a source of randomness, as it often comprises that part of the output data which contains entropy produced by artifacts of the measurement process (e.g. noise in the low bits of a camera charge coupled device (CCD) sensor or microphone). Importantly, this data also represents part of the output data which will not be recorded or transmitted.

In some embodiments, the mobile device may be configured to process raw sensor signals from the sensor by, for example, applying noise filters, identifying anomaly/outlier data points, and detecting errors, prior to delivering processed sensor readings for different applications on the mobile device. The raw sensor data that is discarded in these processing operations may be included in the sensor data subset selected in operation 304.

In at least some embodiments, as part of the selection in operation 304, the mobile device may perform compression of the raw sensor data using a compression technique to obtain a compressed output and select bits that are not included in the compressed output for inclusion in the subset. For example, the mobile device may emulate a data encoding method (e.g. lossy compression) that is typically employed by the sensor to identify which bits will not be included in the compressed output. In particular, the mobile device may perform lossy compression of the raw sensor data and identify bits of the of the sensor data bit stream that are not preserved in the lossy compression output. The identified bits may then be included in the subset of output data obtained in operation 304.

In at least some embodiments, the mobile device may perform comparisons between collected raw sensor output data and the output of lossy data encoding (e.g. a lossy function) on the mobile device. Such comparison may facilitate identification of raw output data that is not included in compressed output. If a first representation of the raw sensor data and a second representation of the output of the lossy encoding are different (for example, in terms of space domain), a domain transform may be applied to one of the representations, in order to facilitate the comparison of raw sensor data and the output of the lossy encoding. For example, the mobile device may determine a suitable transform function from the first domain associated with the first representation to the second domain associated with the second representation, and apply the determined transform to the first representation. Similarly, a transform function from the domain of the representation of the lossy encoding to the domain of the raw sensor data may be determined.

Other techniques for bit selection may be used in operation 304. For example, in some embodiments, the mobile device may select a fixed fraction of a predefined number of low order bits of the sensor data bit stream.

In operation 306, the mobile device retrieves a first representation of accumulated entropy associated with previously acquired raw sensor data for the sensor. With new observations of sensor outputs, the entropy which may be attributed to the output data for those sensor outputs may be captured and stored as numbers or bit representations of numbers. The "accumulated entropy" for a sensor represents an accumulation of such numbers or bits associated with the entropy values for previous sensor outputs. The first representation may, for example, be a numerical value or a bit string. The first representation may be initialized to a static value (e.g. zero) or a value generated using one or more sources of randomness. The sensors of the mobile device may have a respective current representation of accumulated entropy. In particular, a unique current representation of accumulated entropy may be maintained for each of one or more sensors.

The current representations may be stored in a database in association with a respective sensor. Alternatively, each sensor may maintain its own current representation. As new outputs are generated by sensors of the mobile device, the current representations may be updated. In particular, a current representation for a sensor may be combined with a representation of entropy associated with a new sensor output to generate an updated current representation. This current representation, of a function of it, may be used as a source of entropy for the mobile device. Such a source of entropy may, for example, be used to seed, or as a portion of the seed, of a random generator.

In operation 308, the mobile device generates a seed for a pseudorandom number generator based on combining the first representation of accumulated entropy for the sensor and the selected subset of raw sensor output data. That is, the first representation retrieved in operation 306 and the subset of sensor output data selected in operation 304 are combined. In some embodiments, the seed may comprise an updated version of the first representation, i.e. current representation of accumulated entropy for the sensor. For example, the seed may be a numerical value or bit string that is obtained based on the first representation.

The mobile device may implement an accumulation function which is applied to the first representation and a bit representation of the selected subset of raw output data. In some embodiments, the accumulation function may employ a combination of operations on bit strings. For example, the accumulation function may include at least one of cryptographic hash functions, block ciphers, exclusive or, modular addition or subtraction, or scaling operations to the first representation and the bit representation of the selected subset.

Figure 4:
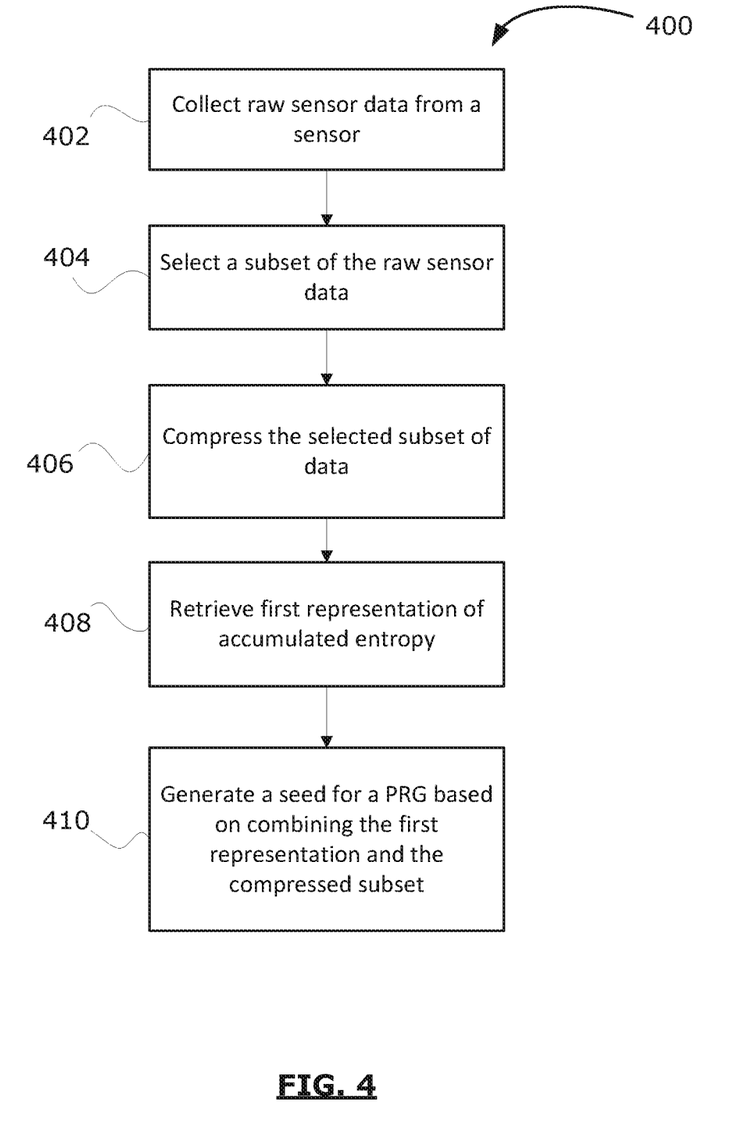
FIG. 4 shows, in flowchart form, another example method for operating a pseudorandom generator on a mobile computing device, in accordance with an example embodiment.

Reference is now made to FIG. 4, which shows, in flowchart form, another example process 400 for operating a pseudorandom generator on a mobile computing device. Similar to process 300, the process 400 may be implemented by a mobile computing device, such as the computing device 100 of FIG. 1. For example, the operations of process 400 may be performed by one or more of the modules 192-196 of FIG. 2.

Operations 402, 404, 408 and 410 of process 400 are similar to operations 302, 304, 306 and 308, respectively. Raw sensor output data is collected from a sensor, in operation 402. The mobile device selects a subset of the collected raw output data for further processing, in operation 404. The selected data subset is then compressed to produce a compressed output. More specifically, the mobile device applies a one-way compression function on the selected subset of raw output data, in operation 406. The one-way compression function of operation 406 is not intended to be a compression that is used to produce a lower fidelity version of the sensor output. Instead, the compression function is intended to be a one-way cryptographic compression function, typically a secure hash algorithm such as SHA-256.

The mobile device retrieves a first representation of the accumulated entropy of the sensor in operation 408, and a seed for a pseudorandom number generator is generated based on combining the first representation and the compressed output, in operation 410. That is, the first representation retrieved in operation 408 and the compressed version of the selected output data from operation 406 are combined to produce the seed. In at least some embodiments, the seed is generated based on an accumulation function that is applied on the first representation and the compressed output. The accumulation function may include a combination of cryptographic hash functions, block ciphers, logical operations (XOR), modular addition or subtraction, or scaling. Various different accumulation functions may be suitable. One such example is provided by the following:

$$f(A,C)=(A+\text{SHA-256}(A)\bmod 2^{256})\text{XOR}(C-\text{SHA-256}(C)\bmod 2^{256}) \quad (1)$$

where A is the first representation of accumulated entropy for the sensor and C denotes the compressed output of operation 406. The above function may be static or time-varying. Another accumulation function that is simpler is the following:

$$f(A,C)=(A\text{ XOR SHA-256}(A\text{ XOR }C)) \quad (2)$$

The output of $f(A, C)$ provides an updated, or current, representation of the accumulated entropy for the sensor, and may serve as a source of entropy (e.g. seed of a PRNG).

Figure 5:
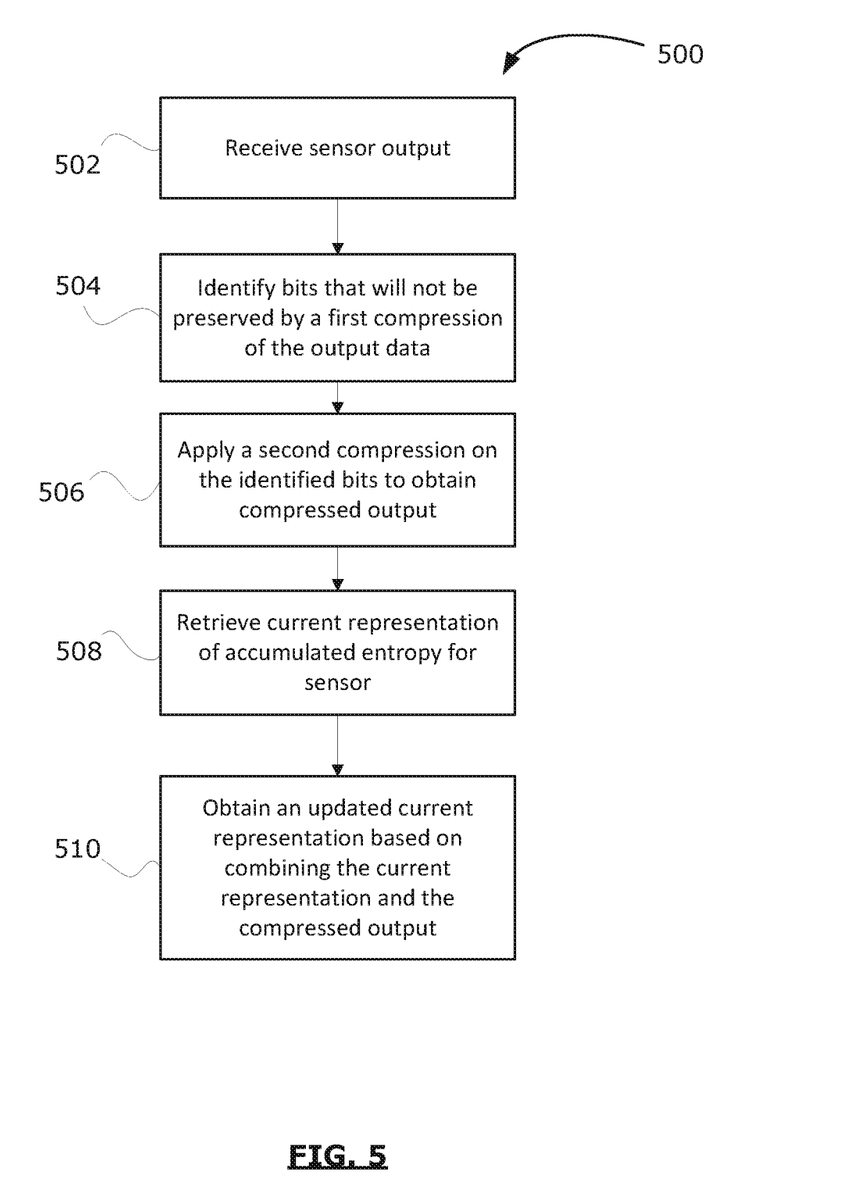
FIG. 5 shows, in flowchart form, an example method for processing raw data collected at a sensor of a mobile computing device, in accordance with an example embodiment.

Reference is now made to FIG. 5, which shows, in flowchart form, an example process 500 for processing sensor output data that is collected on a mobile computing device. The process 500 may be implemented by a mobile computing device, such as the computing device 100 of FIG. 1. In particular, the operations of process 500 may be performed by a software module associated with a sensor of the mobile computing device.

In operation 502, raw sensor output data from the sensor is received by the software module. In particular, a bit stream representation of the raw output data is obtained. The software module then identifies bits that will not be preserved by a first compression of the raw output data. The first compression may be a default compression algorithm that is applied to output data from the sensor. That is, the software module determines which compression function is typically applied on output data from the sensor and identifies those bits of the current raw output data bit stream that will not be contained in the compressed version.

In operation 506, a second compression function is applied on the identified bits to obtain a compressed output. In at least some embodiments, the second compression function is a one-way cryptographic compression function, such as a secure hash algorithm (e.g. SHA-256). The software module then retrieves a current representation of accumulated entropy for the sensor, in operation 508. The current representation represents an accumulation of entropy values associated with one or more previous sensor outputs from the sensor, and may be stored in association with the sensor in a database on the mobile device.

In operation 510, an updated current representation is obtained based on combining the current representation as retrieved and the compressed output. For example, an accumulation function, such as the functions (1) and (2) described above, may be employed to determine the current representation. The process 500 may thus provide a way for a sensor and associated software to maintain a current representation of entropy values that are accumulated with new sensor outputs from the sensor.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for processing raw sensor data of sensors associated with a mobile computing device, the method comprising:
   collecting raw sensor data from at least one sensor associated with the mobile computing device;
   selecting a subset of the raw sensor data based on:
      compressing the raw sensor data using a lossy compression technique to obtain a lossy compressed sensor data output; and
      selecting, for inclusion in the subset, one or more bits from a data bit stream associated with the at least one sensor that are not included in the lossy compressed sensor data output;

applying a one-way cryptographic compression on the selected subset to obtain a compressed value;
retrieving a first representation of accumulated entropy associated with one or more previously acquired raw sensor data sets for the at least one sensor; and
generating an updated current representation of accumulated entropy based on combining the first representation and the compressed value.

2. The method of claim 1, wherein the first representation comprises a first bit string and wherein generating the updated current representation comprises obtaining a second bit string based on the first bit string.

3. The method of claim 1, wherein applying the one-way cryptographic compression on the selected subset comprises applying a cryptographic hash function on the selected subset.

4. The method of claim 3, wherein combining the first representation and the compressed value comprises applying at least one of "exclusive or", addition, subtraction, or scaling operations to the first representation and the compressed value.

5. The method of claim 1, further comprising initializing the first representation to a static value.

6. The method of claim 1, further comprising updating the first representation to incorporate the generated updated current representation.

7. The method of claim 1, wherein selecting the subset of the raw sensor data comprises selecting a fixed fraction of a predefined number of low order bits of a data bit stream associated with the at least one sensor.

8. A mobile computing device, comprising:
at least one sensor;
memory; and
a processor coupled with the at least one sensor and the memory, the processor being configured to:
collect raw sensor data from at least one sensor associated with the mobile computing device;
select a subset of the raw sensor data based on:
compression of the raw sensor data using a lossy compression technique to obtain a lossy compressed sensor data output; and
selection, for inclusion in the subset, of one or more bits from a data bit stream associated with the at least one sensor that are not included in the lossy compressed sensor data output;
apply a one-way cryptographic compression on the selected subset to obtain a compressed value;
retrieve a first representation of accumulated entropy associated with one or more previously acquired raw sensor data sets for the at least one sensor; and
generate an updated current representation of accumulated entropy based on combining the first representation and the compressed value.

9. The mobile computing device of claim 8, wherein the first representation is represented by a first bit string and wherein generating the updated current representation comprises obtaining a second bit string based on the first bit string.

10. The mobile computing device of claim 8, wherein applying the one-way cryptographic compression on the selected subset comprises applying a cryptographic hash function on the selected subset.

11. The mobile computing device of claim 10, wherein combining the first representation and the compressed value comprises applying at least one of "exclusive or", addition, subtraction, or scaling operations to the first representation and the compressed value.

12. The mobile computing device of claim 8, wherein the processor is further configured to initialize the first representation to a static value.

13. The mobile computing device of claim 8, wherein the processor is further configured to update the first representation to incorporate the generated updated current representation.

14. The mobile computing device of claim 8, wherein selecting the subset of the raw sensor data comprises selecting a fixed fraction of a predefined number of low order bits of a data bit stream associated with the at least one sensor.

15. A non-transitory, computer readable medium storing instructions that, when executed by a processor, cause the processor to:
collect raw sensor data from at least one sensor associated with the mobile computing device;
select a subset of the raw sensor data based on:
compression of the raw sensor data using a lossy compression technique to obtain a lossy compressed sensor data output; and
selection, for inclusion in the subset, of one or more bits from a data bit stream associated with the at least one sensor that are not included in the lossy compressed sensor data output;
apply a one-way cryptographic compression on the selected subset to obtain a compressed value;
retrieve a first representation of accumulated entropy associated with one or more previously acquired raw sensor data sets for the at least one sensor; and
generate an updated current representation of accumulated entropy based on combining the first representation and the compressed value.

16. The computer readable medium of claim 15, wherein the first representation comprises a first bit string and wherein generating the updated current representation comprises obtaining a second bit string based on the first bit string.

17. The computer readable medium of claim 15, wherein applying the one-way cryptographic compression on the selected subset comprises applying a cryptographic hash function on the selected subset.

18. The computer readable medium of claim 17, wherein combining the first representation and the compressed value comprises applying at least one of "exclusive or", addition, subtraction, or scaling operations to the first representation and the compressed value.

19. The computer readable medium of claim 15, wherein the instructions, when executed, further cause the processor to update the first representation to incorporate the generated updated current representation.

20. The computer readable medium of claim 15, wherein selecting the subset of the raw sensor data comprises selecting a fixed fraction of a predefined number of low order bits of a data bit stream associated with the at least one sensor.

* * * * *